United States Patent
Singh et al.

(10) Patent No.: US 10,442,117 B2
(45) Date of Patent: Oct. 15, 2019

(54) LASER BASED TYRE MOLD VENT CLEANING PROCESS AND DEVICE

(71) Applicants: Indian Institute of Technology Bombay, Mumbai, Maharashtra (IN); CEAT Tyres Ltd., Mumbai, Maharashtra (IN)

(72) Inventors: Ramesh Kumar Singh, Benares (IN); Sachin Alya, Mumbai (IN); Rinku Kumar Mittal, Mumbai (IN); Adbul Rahim, Mumbai (IN); Shashikant Kharat, Mumbai (IN); Pratik Sampatraj Parmar, Mumbai (IN); Kumar Keshav, Mumbai (IN)

(73) Assignees: Indian Institute of Technology Bombay, Mumbai (IN); CEAT Tyres Ltd., Mumbai (IN)

(*) Notice: Subject to any disclaimer, the term of this patent is extended or adjusted under 35 U.S.C. 154(b) by 236 days.

(21) Appl. No.: 15/489,188

(22) Filed: Apr. 17, 2017

(65) Prior Publication Data

US 2018/0297242 A1 Oct. 18, 2018

(51) Int. Cl.
*B29C 33/72* (2006.01)
*B08B 7/00* (2006.01)
(Continued)

(52) U.S. Cl.
CPC ............... *B29C 33/72* (2013.01); *B08B 5/02* (2013.01); *B08B 7/0042* (2013.01); *B29C 33/10* (2013.01); *B29D 30/0606* (2013.01); *B29D 30/0662* (2013.01); *G01B 11/002* (2013.01); *G01B 11/2518* (2013.01); *B29D 2030/0663* (2013.01); *B29L 2030/00* (2013.01)

(58) Field of Classification Search
None
See application file for complete search history.

(56) References Cited

U.S. PATENT DOCUMENTS

| 6,454,857 | B1 * | 9/2002 | Glasner | B29C 33/72 |
| | | | | 118/306 |
| 2007/0163715 | A1 * | 7/2007 | Rastegar | B08B 3/024 |
| | | | | 156/345.5 |
| 2015/0328773 | A1 * | 11/2015 | Boca | B25J 9/1664 |
| | | | | 700/189 |

FOREIGN PATENT DOCUMENTS

| DE | 19517218 C1 * | 7/1996 | ............. B29C 33/72 |
| JP | 11099524 A * | 4/1999 | |

OTHER PUBLICATIONS

Partial machine translation of DE19517218C1 dated Jul. 1996 obtained from the espace website. (Year: 1996).*
(Continued)

*Primary Examiner* — Robert B Davis
(74) *Attorney, Agent, or Firm* — Pepper Hamilton LLP

(57) ABSTRACT

A vent hole cleaning system is disclosed. The cleaning system is comprised of a housing containing a work table and a support column. The system further comprises a robotic arm mounted on the support column. Further, a subsystem is mounted at an end, opposite to the support column, of the robotic arm. The subsystem may comprise a scanner configured to generate a contour profile of a mold. Further, a vision system may be mounted on the subsystem. The vision system may be communicably connected to the scanner. Further, the system may comprise a cleaning head communicably connected to the vision system and the scanner to enable precision positioning on the mold.

6 Claims, 3 Drawing Sheets

(51) Int. Cl.
*B29D 30/06* (2006.01)
*G01B 11/25* (2006.01)
*B29C 33/10* (2006.01)
*B08B 5/02* (2006.01)
*G01B 11/00* (2006.01)
*B29L 30/00* (2006.01)

(56) References Cited

OTHER PUBLICATIONS

Partial machine translation of JP11099524A dated Apr. 1999 obtained from the espace website. (Year: 1999).*

* cited by examiner

LASER BASED TYRE MOLD VENT CLEANING PROCESS AND DEVICE

TECHNICAL FIELD

The present subject matter described herein, in general, relates to tire molds, and more particularly to cleaning of vents, provided on the tire molds, for releasing hot air.

BACKGROUND

The use of a mold for making products is well known in the fields of manufacturing and automobile industries. One of the sectors in the automobile industry that uses molding processes extensively is the tire manufacturing sector. Tires are manufactured using various molds to obtain a product in a desired way at a large production level.

The molds used in tire manufacturing often have small vent holes of the size of a few hundred microns provided within the molds. The vent holes enable the hot air gases formed, during the molding process, to be released. Over the lifecycle of the mold, the vent holes get clogged with rubber material and start deteriorating the quality of product.

Conventional methods for cleaning the vent holes at regular intervals involve the use of mechanical tools like drilling tools. However, these methods require much human intervention, which can result in human-induced errors such as breakage of small drills in the vent hole, and thus inherently affecting the product while molding. In certain cases, the broken drill may become embedded into the molded tire, rendering the manufactured tire defective and possibly leading to rejection of the entire batch because of a defect in a single tire.

SUMMARY

This summary is provided to introduce aspects related to a vent hole cleaning system for tire molds, the aspects of which are further described below in the detailed description. This summary is not intended to identify essential features of the claimed subject matter nor is it intended for use in determining or limiting the scope of the claimed subject matter.

In one implementation, a vent hole cleaning system is disclosed. The cleaning system is comprised of a housing. Further, the housing contains a work table and a support column. The system further comprises a robotic arm mounted on the support column. Further, a subsystem may be mounted at an end, opposite to the support column, of the cleaning system. The subsystem may further comprise a scanner configured to generate a contour profile of a mold. Further, a vision system may be mounted on the subsystem. The vision system may be communicably connected to the scanner. Further, the system may comprise a cleaning head communicably connected to the vision system and the scanner to enable precision positioning on the mold.

In an embodiment, a vent hole cleaning method is disclosed. The method comprises: scanning of a mold surface using a scanner to generate a contour profile of a mold with one or more vent holes; identifying the location and coordinates of the one or more vent holes from the contour profile using a vision system; transferring the coordinates to a cleaning head; targeting the one or more vent holes with a low energy beam from the cleaning head; and ejecting an air jet in the one or more vent holes to vaporize and remove debris.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer to like features and components.

DETAILED DESCRIPTION

Figure 1:
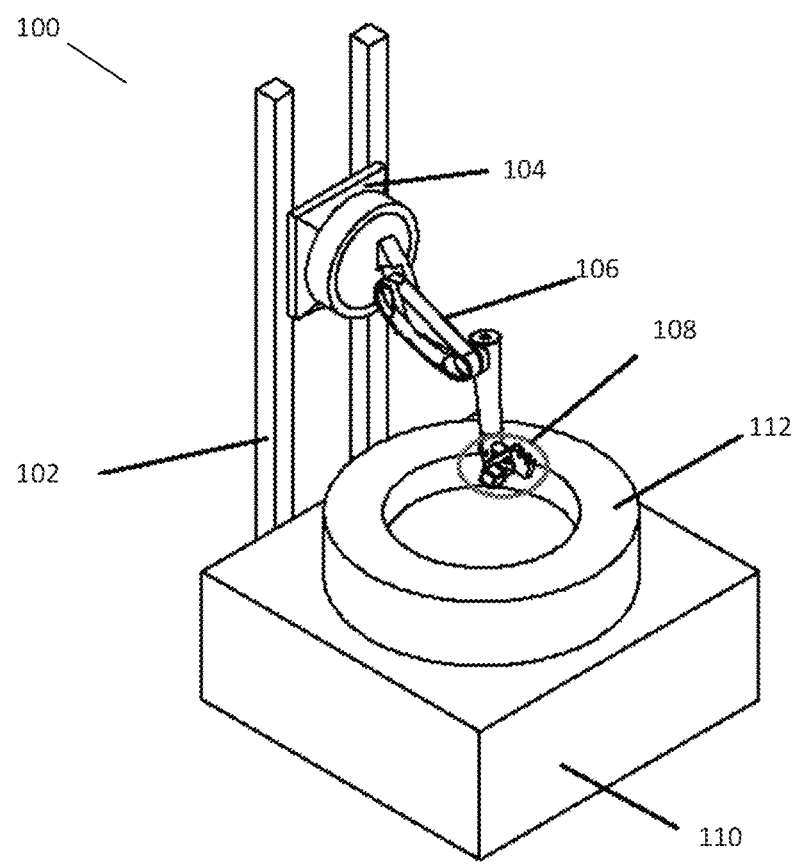
FIG. 1 illustrates a mold cleaning system in accordance with an embodiment.

According to an exemplary embodiment of the present subject matter, a system for cleaning vent holes in a tire mold is disclosed. The exemplary system disclosed may be an open loop system. The exemplary open loop system may rely on a ready CAD model to obtain location of the vent hole on a tire mold, and further identify the vent hole. However, if the mold varies even slightly from the CAD model fed into the system, it may damage the entire mold.

In another exemplary embodiment, a closed loop system for a vent hole cleaning system for a tire mold is disclosed. According to this exemplary embodiment, working in a closed loop system, the system may comprise a scanner system. The scanner system may be a 3D scanner system configured to scan the entire surface of a mold, which may be placed on a work table or other suitable surface. The 3D scanner may further be configured to generate a contour profile of the surface of the scanned mold. Further, a vision system may be communicably connected with the 3D scanner system in the present exemplary embodiment. The vision system may identify vent holes in the mold based on the contour profile of the mold, and further determine their location. The locations can be mapped on the mold in terms of coordinates with a fixed reference, e.g., the locations of the vent holes may be defined by coordinates with the vision system as the reference. The coordinates determined, according to the present embodiment, may further be communicated to a cleaning head. The cleaning head may use a LASER to clean the vent holes and may subsequently use an air jet to clean the residue left in the vent hole or to blow away any fumes.

The LASER in the present exemplary embodiment may be, for example, a low power LASER source. However, in yet another exemplary embodiment, along with the low power LASER source for vent cleaning, a high power LASER may be used for integrating surface cleaning into the exemplary embodiment. Further, an optical system comprising the LASER and optic fiber may completely be enclosed in a tubular casing of the cleaning head, thus ensuring protection of the optics from any kind of dirt or dust.

Further, a small inlet may be provided on a side wall of the cleaning head in the present exemplary embodiment. The small inlet may be configured to supply compressed air. The compressed air may be passed through a nozzle provided at the end of the cleaning head to direct the air jet to the vent hole. This air jet may be used to blow flumes or any kind of debris or residues left partially burnt or un-evaporated.

In the present exemplary embodiment, the 3D scanner system, the vision system, and the cleaning head may be mounted directly onto a robotic arm with all six degrees of freedom. The robotic arm of the present embodiment may further be mounted on a wall to effectively use and maneuver over the entire mold to access all the vent holes.

In another exemplary embodiment, a method for cleaning vent holes in a tire mold is disclosed. The method may comprise scanning of the mold surface with vent holes to generate a contour profile of the mold surface in real-time. This may enable the movement of a cleaning head along the contour parallel to the mold surface. The method further comprises utilizing a vision system configured to identify the vent holes and their locations with respect to the vision system. The identified vent holes may be defined in coordinates and these coordinates may then be transferred to coordinates with respect to a cleaning head. The cleaning head can then align with the vent hole axis. Upon precise alignment, a LASER may be fired along with a pressurized air jet. The cleaning head will then move to all subsequent vents with assistance from the vision system iteratively until all the vent holes are cleaned.

FIG. 1 illustrates a mold cleaning system 100 in accordance with embodiments disclosed herein. The mold cleaning system 100 may comprise one or more support columns 102. A base 104 is mounted on the support column 102. The base 104 may be configured to move in at least one direction, e.g., the base 104 may move in a vertical direction along the length of the support column 102. Further, a robotic arm 106 may be mounted on the base 104. The robotic arm 106 may be configured to have six degrees of freedom enabling it to move on all six axes.

Further, a subsystem 108 may be mounted at the end or the distal end of the robotic arm 106. The present embodiment may further comprise a work table 110 configured to hold a mold 112.

Figure 2:
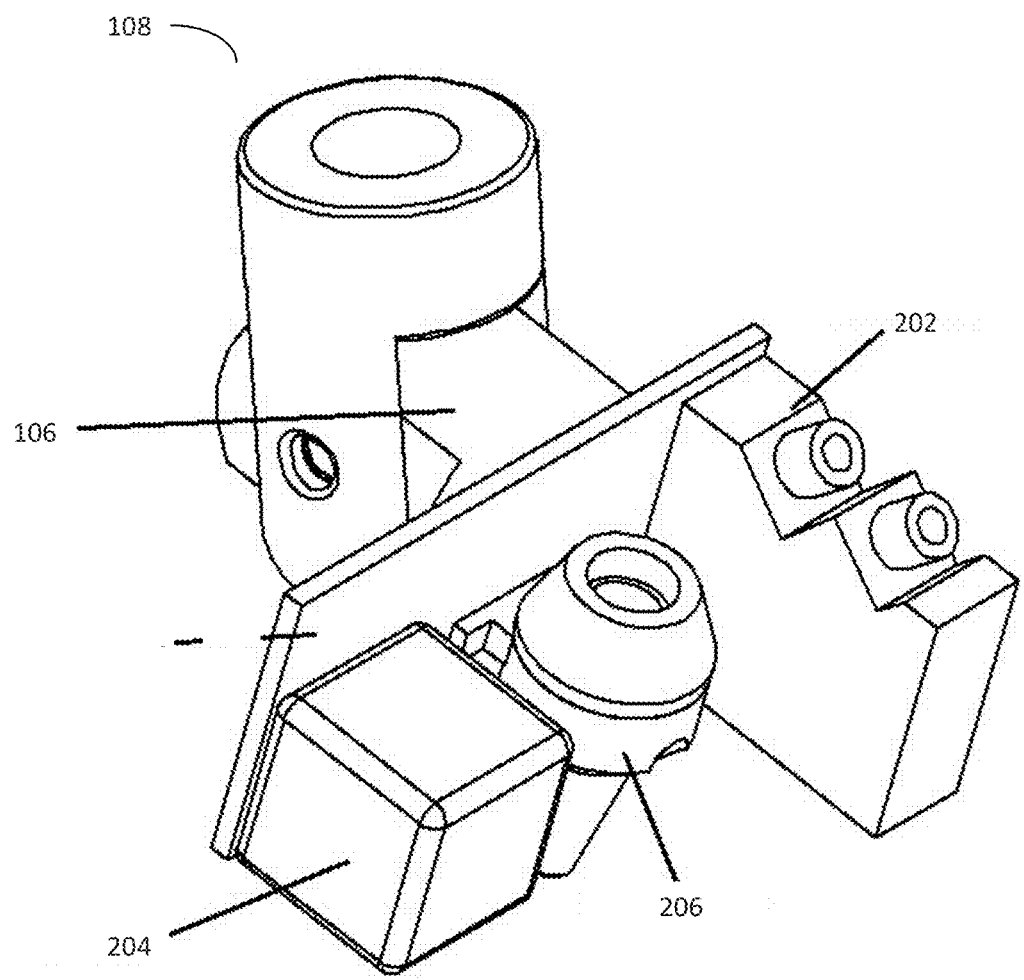
FIG. 2 illustrates a subsystem in accordance with an embodiment.

FIG. 2 illustrates the subsystem 108 in accordance with the present disclosure. The subsystem 108 may comprise a scanner 202. The scanner 202 may be configured to scan the entire mold surface real-time in a 3-dimensional environment, thus allowing for precise generation of work/contour profile of the mold (e.g., the mold 112 shown in FIG. 1). Further, the subsystem 108 may comprise a vision system 204. The vision system may be configured to precisely locate vent holes in a real-time scenario based on the 3D profile generated by the scanner 202.

In another exemplary embodiment, the vision system 204 may be provided with a CAD file of the mold. The vision system 204 may further map the vent hole location from the CAD file with the vent hole located in real-time to precisely locate and determine the coordinates of the vent holes. The vision system 204 may be provided with the CAD file by data communication methods known by one of ordinary skill in the art. The vision system 204 may further comprise at least one camera and at least one sensor (not shown) to determine the location/coordinate of the vent holes based on the real-time data gathered and/or the contour profile generated by the scanner 202.

The subsystem 108 may further comprise a cleaning head 206. The cleaning head 206 may be configured to direct a LASER beam to the desired vent hole and clean the clogging in the vent hole. Further, an air jet with high pressure may be directed to the same vent hole to remove any residual impurities left after the exposure of the vent hole to the LASER. The air jet may be provided via a small opening in the cleaning head 206.

Figure 3:
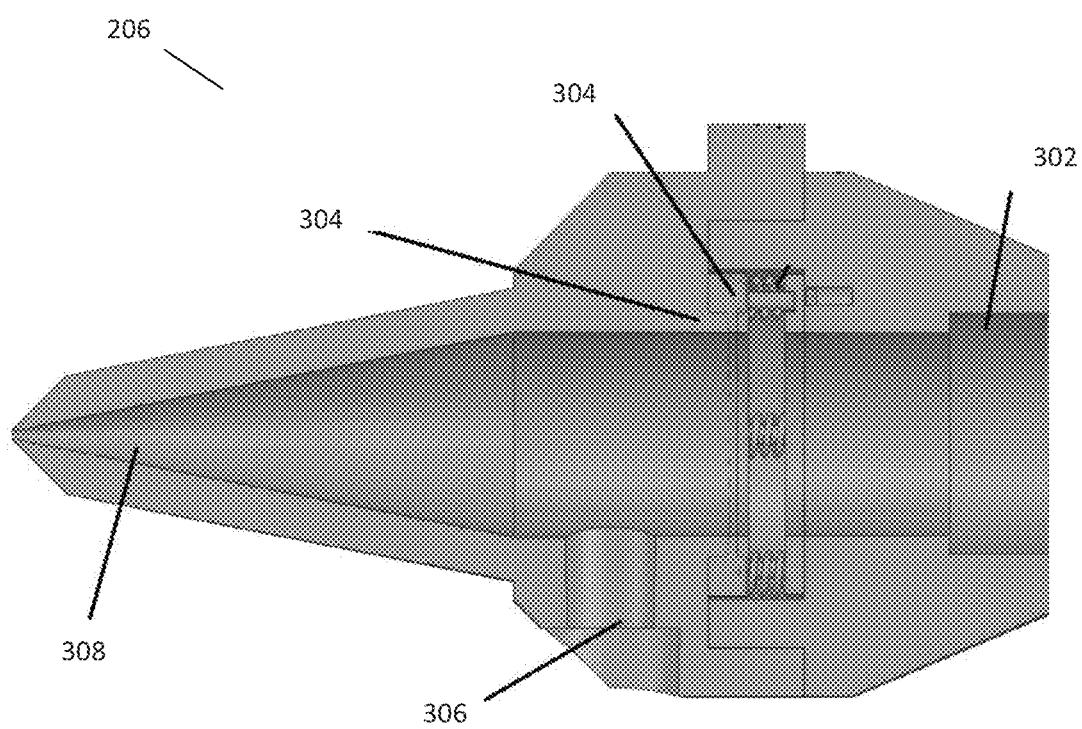
FIG. 3 illustrates a cleaning head in accordance with an embodiment of the present disclosure.

FIG. 3 illustrates a cleaning head 206 in accordance with an embodiment of the present disclosure. The cleaning head 206 may comprise a collimator mount 302. The collimator mount 302 connects to optics, wherein the optics connect a beam source to a collimator mounted within the collimator mount 302. Further, a beam from the collimator may be further focused using a lens. The lens within the cleaning head 206 may be retained in a defined position using a retaining element 304. The number of the retaining elements may be governed by the number of lenses (e.g., two retaining elements 304, each for a corresponding lens).

The cleaning head 206 may further comprise an air inlet passage 306. The air inlet passage 306 may be configured to supply an air jet under pressure to remove any debris or residue left in the vent hole after exposing the same to a LASER. The air jet from the air inlet passage 306 may be directed using a nozzle 308 mounted at an opening in the cleaning head 206, wherein the opening may face the mold. The air jet may help in blowing away any fumes, clean residual debris, and enhance the vaporization.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A vent hole cleaning system, the vent hole cleaning system comprising:
    a housing comprising a work table and a support column;
    a robotic arm mounted on the support column; and
    a subsystem mounted at a distal end of the robotic arm, the subsystem comprising:
        a scanner configured to generate a contour profile of a mold surface having vents;
        a vision system mounted on the subsystem, wherein the vision system is communicably connected to the scanner; and
        a cleaning head communicably connected to the vision system and the scanner to enable real time precision positioning of the vents on the mold surface by mapping the contour profile from the scanner with a CAD file provided to the vision system.

2. The vent hole cleaning system as claimed in claim 1, wherein the cleaning head further comprises a collimator, wherein the collimator is configured to provide a low energy beam.

3. The vent hole cleaning system as claimed in claim 2, wherein the low energy beam is further projected onto a lens, wherein the lens is retained in a defined position within the cleaning head.

4. The vent hole cleaning system as claimed in claim 3, wherein the lens is retained using a retaining element.

5. The vent hole cleaning system as claimed in claim 1, wherein the cleaning head further comprises an air inlet passage.

6. The vent hole cleaning system as claimed in claim 5, wherein the air inlet passage is further connected to a nozzle.

* * * * *